United States Patent
Vemparala Guruswamy et al.

(10) Patent No.: US 11,969,140 B2
(45) Date of Patent: Apr. 30, 2024

(54) SURFACE CLEANING

(71) Applicant: Micron Technology, Inc., Boise, ID (US)

(72) Inventors: Priya Vemparala Guruswamy, Boise, ID (US); Chunhua Yao, Boise, ID (US); Anshika Sharma, Boise, ID (US); Xiao Li, Boise, ID (US); Cipriana Forgy, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 234 days.

(21) Appl. No.: 17/354,179

(22) Filed: Jun. 22, 2021

(65) Prior Publication Data
US 2022/0400924 A1    Dec. 22, 2022

(51) Int. Cl.
| | |
|---|---|
| A47L 9/28 | (2006.01) |
| A47L 11/28 | (2006.01) |
| A47L 11/40 | (2006.01) |
| B08B 1/04 | (2006.01) |
| B08B 3/08 | (2006.01) |
| B08B 5/04 | (2006.01) |
| G06N 20/00 | (2019.01) |

(52) U.S. Cl.
CPC .......... *A47L 9/2826* (2013.01); *A47L 9/2847* (2013.01); *A47L 9/2894* (2013.01); *A47L 11/28* (2013.01); *A47L 11/408* (2013.01); *B08B 1/04* (2013.01); *B08B 3/08* (2013.01); *B08B 5/04* (2013.01); *A47L 2201/04* (2013.01); *A47L 2201/06* (2013.01); *G06N 20/00* (2019.01)

(58) Field of Classification Search
CPC .... A47L 9/2894; A47L 9/2847; A47L 9/2826; A47L 11/408; A47L 11/28; A47L 2201/04; A47L 2201/06; B08B 1/04; B08B 5/04; B08B 3/08; G06N 20/00
See application file for complete search history.

(56) References Cited

U.S. PATENT DOCUMENTS

| | | | |
|---|---|---|---|
| 7,677,239 B2 | 3/2010 | De Miranda Grieco | |
| 9,798,957 B2 * | 10/2017 | Noh | G05D 1/0246 |
| 10,423,163 B2 * | 9/2019 | Choi | A47L 9/2826 |
| 10,534,367 B2 * | 1/2020 | Haegermarck | G05D 1/0274 |
| 10,624,514 B2 * | 4/2020 | Park | G05D 1/0246 |
| 10,678,251 B2 * | 6/2020 | Haegermarck | A47L 9/2826 |
| 11,027,395 B2 | 6/2021 | Suzuki | |
| 11,175,670 B2 * | 11/2021 | Artes | A47L 11/4011 |
| 11,188,086 B2 * | 11/2021 | Vogel | G05D 1/0234 |
| 11,334,084 B2 * | 5/2022 | Lee | G06T 7/70 |
| 11,474,533 B2 * | 10/2022 | Forsberg | A47L 9/2826 |

(Continued)

*Primary Examiner* — Shogo Sasaki
(74) *Attorney, Agent, or Firm* — Brooks, Cameron & Huebsch, PLLC (57) ABSTRACT

Methods and apparatuses associated with surface cleaning are described. Examples can include detecting at a processing resource of a robot and via a temperature sensor of the robot, a temperature of a surface on which the robot is located. Examples can include the processing resource shutting down the robot in response to the temperature being at or above a particular threshold temperature, and the processing resource instructing the robot to clean the surface following a particular cleaning path using a vacuum, a scrubber, or both in response to the temperature being below a particular threshold temperature.

11 Claims, 5 Drawing Sheets

(56) References Cited

U.S. PATENT DOCUMENTS

| | | | | |
|---|---|---|---|---|
| 2015/0147829 A1* | 5/2015 | Benvegnu | ............... | B24B 49/04 |
| | | | | 451/5 |
| 2016/0298970 A1 | 10/2016 | Lindhe | | |
| 2018/0093360 A1* | 4/2018 | Shinozaki | ............. | B24B 37/013 |
| 2018/0150052 A1* | 5/2018 | Cherian | ............... | G05B 19/406 |
| 2018/0304435 A1* | 10/2018 | Xu | ......................... | B24B 37/013 |
| 2019/0240799 A1* | 8/2019 | Takeda | .................... | B24B 49/04 |
| 2019/0283209 A1* | 9/2019 | Osterheld | ........... | B24B 27/0069 |
| 2019/0299356 A1* | 10/2019 | Xu | ......................... | G06N 3/063 |
| 2020/0342730 A1 | 10/2020 | Liu | | |

\* cited by examiner

SURFACE CLEANING

TECHNICAL FIELD

The present disclosure relates generally to apparatuses and methods associated with surface cleaning.

BACKGROUND

A computing device is a mechanical or electrical device that transmits or modifies energy to perform or assist in the performance of human tasks. Examples include robots that can replicate certain human movements and functions (e.g., carry out a series of actions) automatically. As used herein, "automatically" can include an action performed with limited or no user input and/or with limited or no prompting. In some examples, robots can be guided by an external control device or the control may be embedded within.

Robots may accept electronic programming, process data or physical perceptions electronically, operate autonomously to some degree, move around, operate physical parts of itself or physical processes, sense and manipulate their environment, and exhibit intelligent behavior (e.g., behavior which mimics humans or other animals). Example robots include mobile robots such as cleaning robots (e.g., vacuuming robot, dusting robot, mopping robot, lawn mowing robot, etc.) and delivery robots (e.g., drones, package delivery robot, etc.), industrial robots, interactive robots, and modular robots, among others.

Devices (e.g. edge device, computing device, etc.) can receive input data via sensors. As referred herein, the term "sensor" can be a device and/or a subsystem of a device that responds to a physical stimulus (e.g., heat, light, sound, pressure, magnetism, or a particular motion) and transmits a resulting impulse as for measurement or operating a control. Sensors can include temperature sensors, heat sensors, movement sensors, biosensors, infrared illuminator, etc. Memory can be used heavily in connection with such sensors in edge devices and other devices receiving input data via such sensors.

DETAILED DESCRIPTION

Apparatuses and methods related to surface cleaning are described. Robots are used for several tasks including cleaning tasks. For instance, cleaning robots can clean items in their path and can move around large static items (e.g., a chair). However, these robots may not identify what is in their path or determine what is a most efficient and effective cleaning approach to a current cleaning task. Similarly, if the surface is hot, the robot may not detect the heat, and damage may occur to the robot, the surface, or both, if the robot performs a cleaning task on the hot surface.

Examples of the present disclosure can improve effectiveness and performance of robots by allowing for detection of different solids, liquids, chemicals, temperatures, or any combination thereof in the robot's path. For instance, examples of the present disclosure can use sensors to detect different items or challenges in a robot's path and adjust a cleaning parameter of the robot based on what is detected. The adjustment can occur during the cleaning task and can be further adjusted, for instance using a machine learning model, upon completion of the cleaning task.

Examples of the present disclosure can include detecting at a processing resource of a robot and via a temperature sensor of the robot, a temperature of a surface on which the robot is located. In response to the temperature being at or above a particular threshold temperature, the method can include the processing resource shutting down the robot, and in response to the temperature being below a particular threshold temperature, the method can include the processing resource instructing the robot to clean the surface following a particular cleaning path using a vacuum, a scrubber, or both.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits.

Figure 4:
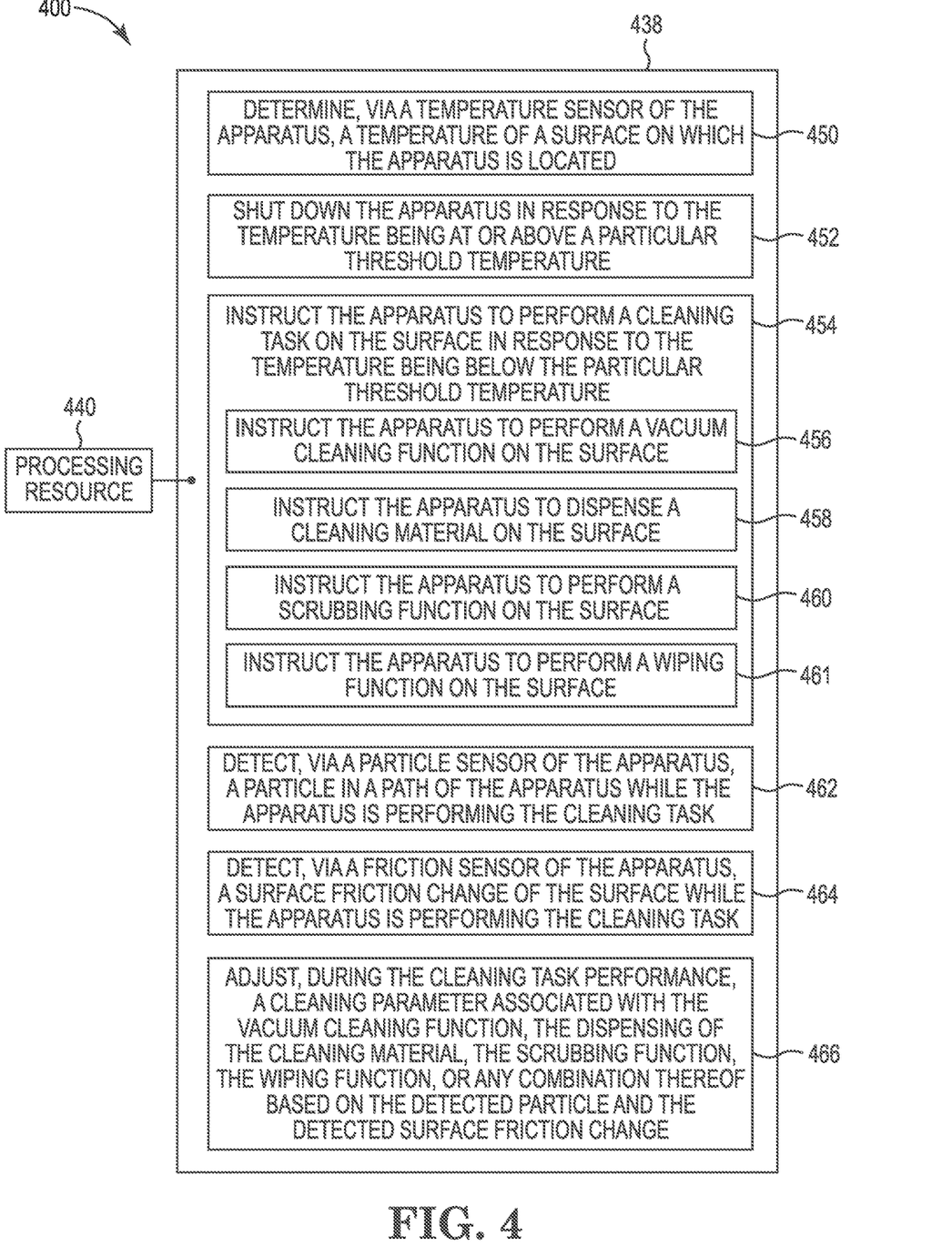
FIG. 4 is another functional diagram representing a processing resource in communication with a memory resource having instructions written thereon in accordance with a number of embodiments of the present disclosure.

For example, 100 can reference element "00" in FIG. 1, and a similar element can be referenced as 400 in FIG. 4. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Some examples of the present disclosure include the use of sensors and machine learning models to improve functionality of a robot, including a surface cleaning robot. For instance, examples of the present disclosure can include a robot (e.g., apparatus) configured to detect heat, particles, dust, friction, and different chemicals, among others, associated with a surface on which the robot is cleaning and clean the surface based on what was detected. Cleaning parameters of the robot, such as scrubbing speed, scrubbing pressure, cleaning material amount, cleaning material dispensing pressure, etc. can be adjusted during cleaning based on what is detected on the surface. A particular path taken by the cleaning robot can be adjusted, in some examples before, during, or after performance of a cleaning task.

Figure 1A:
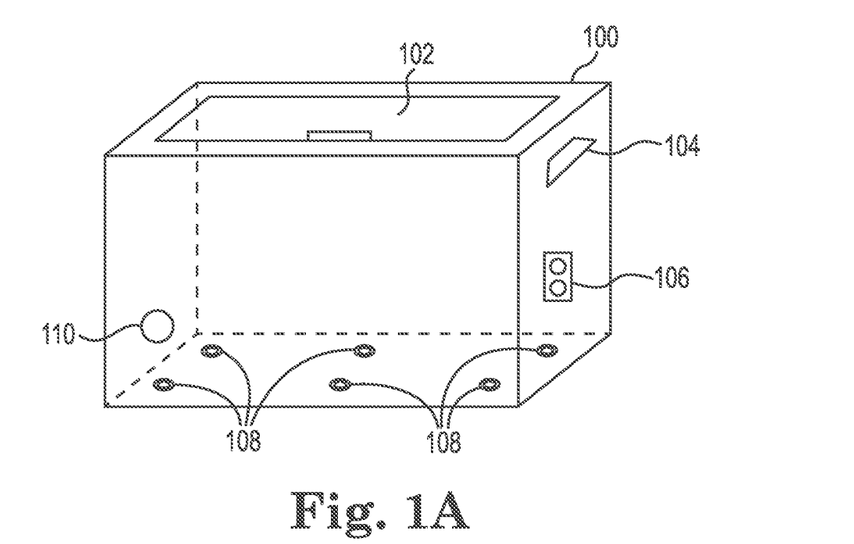
FIG. 1A is a diagram of a perspective view of an example surface cleaning apparatus for surface cleaning in accordance with a number of embodiments of the present disclosure.
Figure 1B:
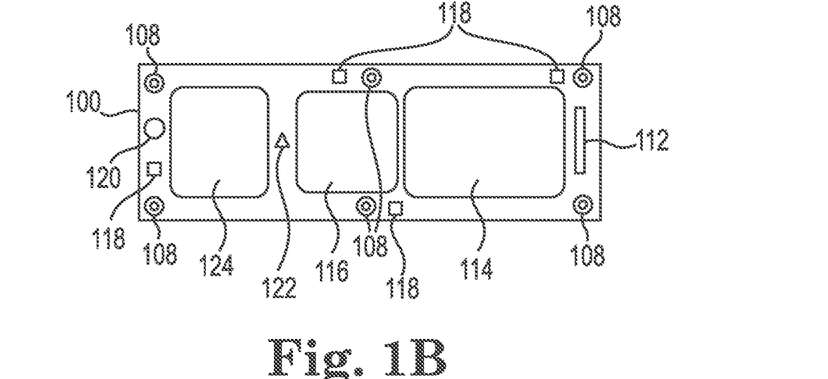
FIG. 1B is a diagram of a bottom view of an example surface cleaning apparatus for surface cleaning in accordance with a number of embodiments of the present disclosure.

FIGS. 1A and 1B are diagrams of different views of an example surface cleaning apparatus 100. For example, FIG. 1A is a diagram of a perspective view of an example surface cleaning apparatus 100 for surface cleaning in accordance with a number of embodiments of the present disclosure, and FIG. 1B is a diagram of a bottom view of the example surface cleaning apparatus 100 for surface cleaning in accordance with a number of embodiments of the present disclosure. For ease of reference, FIGS. 1A and 1B will be described together.

The surface cleaning apparatus 100 (hereinafter referred to as "the apparatus 100" or "the robot 100") can include a robot for cleaning a surface. For instance, the apparatus 100 may be used to clean a surface of a stove (e.g. a stovetop), a countertop surface, an interior surface of an oven, a floor surface, etc. While the apparatus 100 is illustrated as a rectangular prism in FIG. 1A, the apparatus 100 may be a different shape and elements of the apparatus 100 may be arranged differently than as illustrated in FIGS. 1A and 1B.

The apparatus 100 can include wheels 108 that allow the apparatus 100 to move across the surface. While six wheels 108 are illustrated in FIGS. 1A and 1B, more or fewer wheels 108 may be present on the apparatus 100. The apparatus 100 can include a handle 104 for moving the apparatus 100 and can include an access door 102 to access internal components, remove waste, or both, from the apparatus 100. More or fewer access doors 102 may be present on the apparatus 100. For instance, access may be facilitated to electric components, liquid waste, solid waste, etc. via various access doors 102. The apparatus 100 can include in some examples a spray dispenser 106, for instance, configured to spray a fragrance upon completion of a cleaning task. Other aerosols may be dispensed from spray dispenser 106, in some instances.

The apparatus 100 can include a camera or image sensor 110. The camera 110 may be located on one or more sides of the apparatus 100 and can capture the surface to be cleaned and/or any item (e.g., dirt, liquid, object, etc.) in a path of the apparatus 100. In some examples, the camera 110 can be used when determining an initial cleaning path and/or subsequent cleaning paths for the apparatus 100 to take during a cleaning task. For instance, if the cleaning task includes cleaning a stovetop, and the camera 110 detects a large puddle of liquid on the stovetop or a glowing red burner, the apparatus 100 can consider the puddle, the burner, or both, when determining a particular path for cleaning and/or when determining what cleaning components of the apparatus 100 to use at particular parts of the particular path. In the examples illustrated in FIGS. 1A and 1B, the camera 110 is located at the front on the apparatus 100 (example the apparatus 100 moves toward the left of the page), but examples are not so limited.

In addition to, or alternatively to, the camera 110, the apparatus 100 can include one or more sensors 118, 120, 122 to gather data associated with the surface on which the apparatus 100 is located and performing a cleaning task. For instance, the apparatus 100 can include a temperature sensor 118, a particle sensor 120, a friction sensor 122, or any combination thereof. Other sensors, such as a pressure sensor, electric nose (e.g., odor sensor), fall sensor (e.g., to detect ledges), or various environmental sensors may be present on the apparatus 100 in some examples.

The temperature sensor 118, for example, may determine a temperature of the surface. In an example where the surface is a stovetop, the temperature sensor 118 may determine whether the stovetop is too hot for the apparatus 100 to begin cleaning, or if the cleaning task can proceed. The particle sensor 120 can detect a particle such as a crumb, dust particle, dirt, etc. on the surface, and the friction sensor 122 can detect a surface friction change of the surface. For instance, in the stovetop example, the friction sensor 122 may detect a change from a smooth, clean surface to a surface covered in grease or food dried on the surface. Put another way, the apparatus 100 can use the camera 110 or other sensors to receive data and use the data to detect items in the apparatus' 100 path while performing a cleaning task. The data may include associated metadata that describes and provides information about the data (e.g., location, name of file, etc.). Based on the data gathered by the sensors 118, 120, 122, the apparatus 100 (e.g., via a processing resource) can make determinations associated with the cleaning task.

For instance, the apparatus 100 may dispense cleaning material (e.g., detergent, disinfectant, water, etc.) via a cleaning material dispenser 112 based on a type (e.g., solid, liquid, gel, grease, water, chemical, etc.) of material in the path of the apparatus 100. In some examples, the cleaning material dispenser 112 may dispense water with the cleaning material, or another dispenser (not illustrated) may dispense water separately from the cleaning material dispenser 112.

In an example, if the friction sensor 122 detects a change in friction of the surface (e.g., change in a coefficient of friction), a greater amount of cleaning material may be dispensed from the cleaning material dispenser 112 to attack stuck-on material. Similarly, a scrubber 116 may be instructed to increase a scrubbing speed or pressure to address the stuck-on material. In an example where water is dispersed, a higher water pressure may be used to address the stuck-on material or may be sprayed on the stuck-on material for soaking. The scrubber 116 may be a heat-resistant, non-scratch, silicon (or other material) scrubber having adjustable speeds (e.g. rotation speeds) and pressures.

In another example, the particle sensor 120, the camera 110, or both, may detect dust particles on the surface. In response, the apparatus 100 can instruct a vacuum 124 to vacuum the dust particles. In some examples, wipes (e.g., dry or wet) may be dispensed from a wipe dispenser 114. For example, upon completion of a cleaning performance, the surface may be wiped for a final cleaning process stage. In some examples, the wipe may be dispensed manually from the wipe dispenser 114 or as the apparatus 100 performs the cleaning task (e.g., via a flipping component in the wipe dispenser 114).

The apparatus 100 may be a wired or wireless device. The apparatus 100 may be battery operated and can be charged wirelessly, with a wired connection, or any combination thereof. The apparatus 100 can transmit and receive signals wirelessly, for instance via a radio, to computing devices. In some examples, the apparatus 100 can transmit and receive signals via an application downloaded on a computing device (e.g., tablet, smartphone, smartwatch, personal computer, laptop, etc.).

In some examples, a particular cleaning path of the apparatus 100, cleaning parameter adjustments, or both, can be determined using a machine learning model. The machine learning model, for example, can be based on a training data set provided to the apparatus 100, as well as data collected during previous cleaning tasks. For example, the machine learning model can use classifications (e.g., dirt, chemical, water, grease, etc.) that were made in previous encounters to determination a classification for a current item in the path of the apparatus 100. Using the machine learning model, it may be determined that a previous encounter with grease necessitated extra cleaning material, and the apparatus 100 can dispense addition cleaning material via the dispenser 112.

Deployment of machine learning models associated with the apparatus 100 can occur locally, at a cloud-based service, or a combination thereof. For instance, the apparatus can execute a cleaning task (e.g., wiping a stovetop), and a machine learning model can be run as a sub-task classifying items detected during the main task. Similarly, a machine learning model can be used to analyze and compare characteristics of the item compare to previously encountered items, as well as data on which the machine learning model was trained. This can confirm whether or not the item has been previously encountered and what type of item it is.

The machine learning models can be deployed while the apparatus 100 is charging or while the apparatus 100 is performing the main task. In some examples, training of machine learning models can be performed while the apparatus 100 is charging (e.g., at a charging station), in some example, to preserve battery life of the apparatus 100 and increase security. For instance, training while the apparatus 100 is performing its main task may reduce battery life and performance. In addition, training while the apparatus 100 is performing its main task may make personal data susceptible to hacking because the data is sent over a network. In some examples, with secure encryption, training may be performed via a cloud-based service.

In a non-limiting example, the apparatus 100 can be a stovetop surface cleaning robot. For instance, a user can power on the apparatus 100 and pair the apparatus 100 with a computing device, such as a smartphone, via an application. The user can transmit an image of the stovetop to the apparatus 100, the apparatus 100 can use the camera 110 to take a photograph of the stovetop, or both. Using an initial image, the apparatus 100 can determine an initial cleaning path and calculate distances and times for performing a cleaning task. The determined cleaning path can include calculated distances and maps and/or fall sensors to avoid ledges (e.g., to prevent falls).

In some examples, the user can draw a cleaning path for the apparatus 100. For instance, the user can draw a path on the stovetop image using a touchscreen of the computing device. The cleaning path can be used in training of the machine learning model and can be updated as the apparatus 100 is used and learns more about the stovetop. Similarly, as hotspots may be detected with the temperature sensor 118, the camera 110, or both, during the cleaning task, the cleaning path may change. As the apparatus 100 performs a cleaning task, other sensors may detect items and cause the cleaning path to change.

In the stovetop example, the apparatus 100 can be instructed to begin cleaning the stovetop surface via an input on the apparatus 100 (e.g., an on/off button) or via the linked application. The apparatus 100 can use the temperature sensor 118, the camera 110, or both, to determine whether the cleaning task can commence. For instance, the apparatus 100 may check an initial location or do a full cleaning path route to determine whether the temperature of the stovetop is below a particular threshold. If the stovetop temperature is at or above the particular threshold, the apparatus 100 can shut down and alert the user, for instance via an audio alert from the apparatus 100, an alert via the application, or both. If the stovetop temperatures is below the particular temperature threshold, the apparatus 100 can commence the cleaning task, as further discussed herein. The particular temperature threshold, for instance, can include a temperature at which the apparatus 100, components of the apparatus 100, or both, may sustain damage, fail to function, or underperform.

Figure 2:
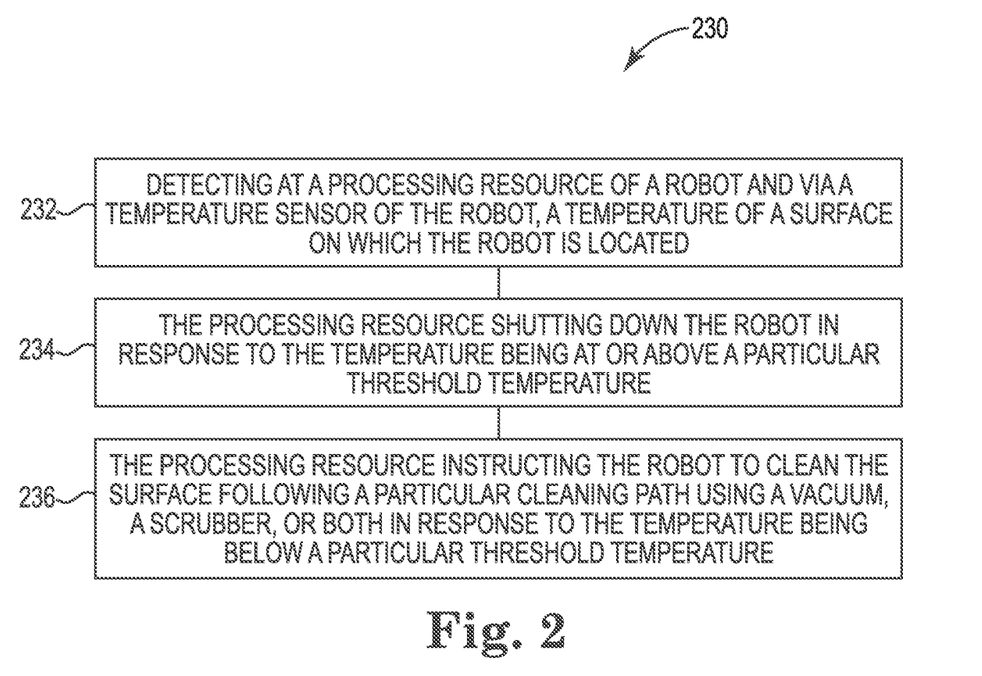
FIG. 2 a flow diagram representing an example method for surface cleaning in accordance with a number of embodiments of the present disclosure.

FIG. 2 a flow diagram representing an example method 230 for surface cleaning in accordance with a number of embodiments of the present disclosure. The method 230 can be performed by a system or apparatus, such as the apparatus 100, 300, or 400 described with respect to FIGS. 1, 3, and 4, respectively. For instance, the method 230 can be performed by a surface cleaning robot.

At 232, the method 230 can include detecting at a processing resource of a robot and via a temperature sensor of the robot, a temperature of a surface on which the robot is located. For instance, the robot can be powered on, and the temperature sensor can determine whether the surface on which the robot is located is at or above a particular threshold temperature. The temperature check can be performed initially at start of a cleaning task and while the cleaning task is being performed. For instance, the temperature sensor can periodically or continuously monitor a temperature of the surface. In some examples, the temperature is determined using a camera or image sensor of the robot.

At 234, the method 230 can include the processing resource shutting down the robot in response to the temperature being at or above a particular threshold temperature. For example, if at some point during the cleaning task, either at an initial temperature check or a subsequent temperature check, the robot can shut down to stop the cleaning process. This can protect the surface, the robot, components of the robot, or any combination thereof. In some examples, the robot can move to a different location before shutting down to protect the robot or components of the robot from heat damage. The processing resource can transmit a shutdown alert to a different processing resource of a computing device accessible by a user in response to the temperature being at or above the particular threshold temperature. For instance, an application downloaded on a smartphone may issue an alert that the robot has shut down due to surface temperature. In some examples, the robot can provide a visual or audio alert of the shutdown such as an audible beep or flashing light on the robot.

At 236, the method 230 can include the processing resource instructing the robot to clean the surface following a particular cleaning path using a vacuum, a scrubber, or both in response to the temperature being below a particular threshold temperature. The particular cleaning path, for instance, can be determined using an image of the surface, using a trained machine learning model, or both. For instance, an initial cleaning path may be chosen for the robot but based on data received from a plurality of sensors and a camera on the robot, input from a user (e.g., via an application), or any combination thereof the cleaning path can be updated using the machine learning model. The updated machine learning model can continue to be updated as the robot gathers more data. The particular cleaning path, in some examples, may change as the robot performs the cleaning task, for instance based on data gathered by the sensors, camera, or both, during performance of the cleaning task.

In some examples, the method 230 can include the processing resource determining a cleanliness level of each of a plurality of portions of the surface using a camera, a particle sensor, a friction sensor, or any combination thereof. For instance, as the robot moves across the surface, the camera can detect items such as liquids or solids in a path of the robot, and the particle sensor and the friction sensor can detect dust, dirt, stuck-on materials, etc. The cleanliness level can include how much of particular items and what types of items are present on the particular portions. For instance, a first portion of the surface having only water may have a cleanliness level higher than a second portion of the surface having grease and stuck-on material. Cleaning parameters of the robot may be adjusted based on the cleanliness level.

For example, the processing resource can instruct a dispenser of the robot to dispense, during cleaning of the surface, a first amount of cleaning material on a first portion of the surface having a first cleanliness level, and dispense, during cleaning of the surface, a second amount of cleaning material on a second portion of the surface having a second cleanliness level. The first amount of cleaning material may be lower than the second amount of cleaning material if the first cleanliness level is higher (e.g., the first portion is cleaner) as compared to the second cleanliness level (e.g., the second portion is less clean).

In another example, the processing resource can instruct the scrubber of the robot to apply, during cleaning of the surface, a first pressure to a first portion of the surface having a first cleanliness level and a second pressure to a second portion of the surface having a second cleanliness level. The first pressure may be lower than the second pressure if the first cleanliness level is higher (e.g., the first portion is cleaner) as compared to the second cleanliness level (e.g., the second portion is less clean). Similarly, the scrubber of the robot, when instructed by the processing resource can apply, during cleaning of the surface, a first scrubbing speed to a first portion of the surface having a first cleanliness level and a second scrubbing speed to a second portion of the surface having a second cleanliness level. The first speed may be lower than the second speed if the first cleanliness level is higher (e.g., the first portion is cleaner) as compared to the second cleanliness level (e.g., the second portion is less clean).

In some examples, a cleanliness level may be based on how difficult the particular portion is to clean. For instance, a particular portion completely covered in dust may have a higher cleanliness level than a portion with a small piece of melted material because the melted material may take more time to clean (e.g., extra scrubbing time), extra cleaning material, and multiple rounds of cleaning as compared to the dust that may take only a single pass with a vacuum component of the robot.

Figure 3:
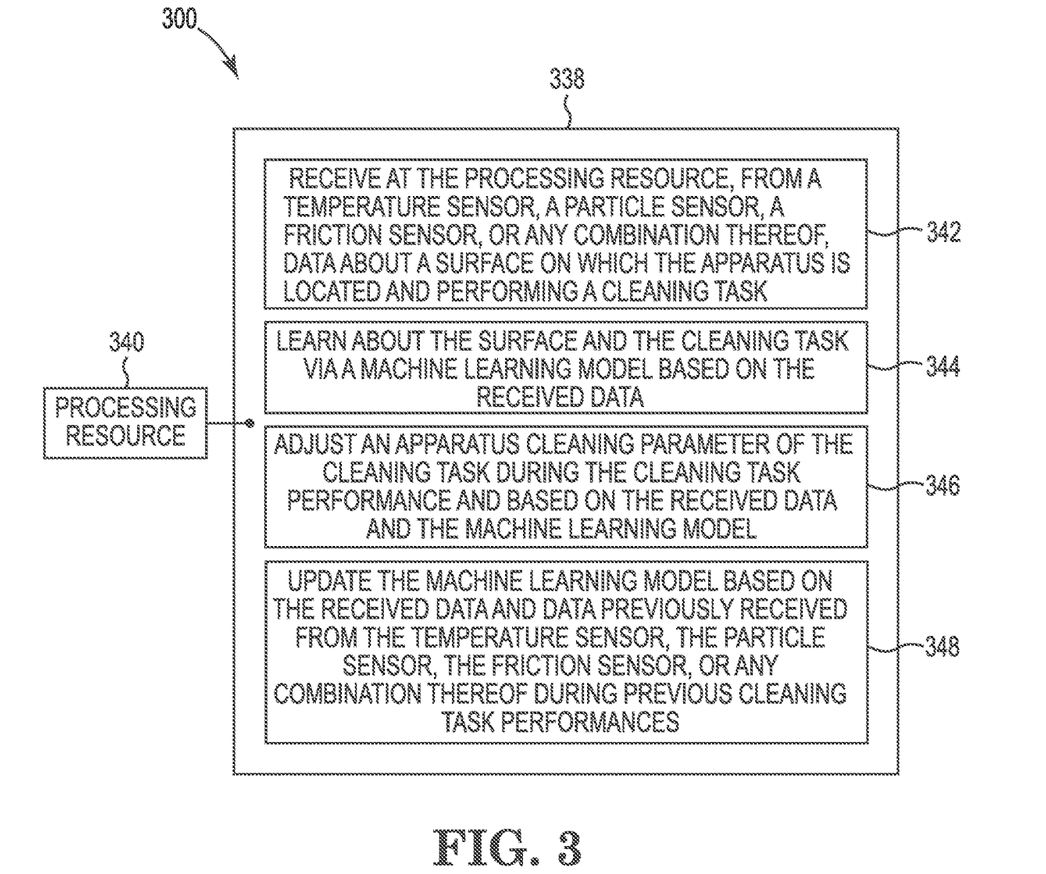
FIG. 3 is a functional diagram representing a processing resource in communication with a memory resource having instructions written thereon in accordance with a number of embodiments of the present disclosure.

FIG. 3 is a functional diagram representing a processing resource 340 in communication with a memory resource 338 having instructions 342, 344, 346, 348 written thereon in accordance with a number of embodiments of the present disclosure. The apparatus 300 can be analogous to the apparatus 100 and/or the apparatus 400 as illustrated in FIGS. 1 and 4, respectively.

The apparatus 300 illustrated in FIG. 3 can be a server or a computing device (e.g., a robot or a portion of a robot) and can include the processing resource 340. The apparatus 300 can further include the memory resource 338 (e.g., a non-transitory MRM), on which may be stored instructions, such as instructions 342, 344, 346, 348. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 338 may be electronic, magnetic, optical, or other physical storage device that stores executable instructions. Thus, the memory resource 338 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 338 is a non-transitory MRM comprising Random Access Memory (RAM), an Electrically-Erasable Programmable ROM (EEPROM), a storage drive, an optical disc, and the like. The memory resource 338 may be disposed within a controller and/or computing device. In this example, the executable instructions 342, 344, 346, 348 can be "installed" on the device. Additionally and/or alternatively, the memory resource 338 can be a portable, external or remote storage medium, for example, that allows the system to download the instructions 342, 344, 346, 348 from the portable/external/remote storage medium. In this situation, the executable instructions may be part of an "installation package". As described herein, the memory resource 338 can be encoded with executable instructions for surface cleaning (e.g., via a robot).

The instructions 342, when executed by a processing resource such as the processing resource 340 can receive at the processing resource 340, from a temperature sensor, a particle sensor, a friction sensor, or any combination thereof, data about a surface on which the apparatus 300 is located and performing a cleaning task. For example, the data received from the temperature sensor can include a temperature of each of a plurality of portions of the surface, the data received from the particle sensor can include detected particles on each of a plurality of portions of the surface, and the data received from the friction detector can include an amount of friction on each of a plurality of portions of the surface. Other data may also be gathered from other sensors on the apparatus 300, a camera on the apparatus 300, or any combination thereof.

For instance, the processing resource 340 or memory resource 338 can receive, from the sensors, data about the cleaning task and items in the path of the apparatus 300 while the apparatus 300 is performing the cleaning task. For instance, as the apparatus 300 is cleaning, the apparatus 300 (e.g., at the processing resource 340, the memory resource 338, or both), can receive image data, debris data, liquid data, chemical data, temperature data, and other data depending on the sensor-type associated with the cleaning task and the apparatus 300.

The instructions 344, when executed by a processing resource such as the processing resource 340 can learn about the surface and the cleaning task via a machine learning model based on the received data. For instance, learning about the surface can include learning about the surface, cleaning task, or both, based on data received from sensors during the cleaning task and from previous cleaning task performances. For instance, the machine learning model may learn that a particular portion of a surface is historically dirty and may adjust a cleaning path (e.g., update the machine learning model) to focus on the particular portion.

The instructions 346, when executed by a processing resource such as the processing resource 340 can adjust an apparatus cleaning parameter of the cleaning task during the cleaning task performance and based on the received data and the machine learning model. As used herein, an apparatus cleaning parameter can include how a function of a component of the apparatus 300 is performed. For instance, the apparatus cleaning parameter adjusted may include an amount of cleaning material dispensed from a dispenser of the apparatus 300, a speed of a scrubber (e.g., a rotation speed) of the apparatus 300, a pressure of a scrubber of the apparatus 300, a time period spent cleaning the surface, the cleaning path, or any combination thereof.

The instructions 348, when executed by a processing resource such as the processing resource 340 can update the machine learning model based on the received data and data previously received from the temperature sensor, the particle sensor, the friction sensor, or any combination thereof during previous cleaning task performances. For instance, the machine learning model can combine the data to improve efficiency and effectiveness of the apparatus 300 and its performance of the cleaning task.

In some examples, learning about the surface and the cleaning task and updating the machine learning model can be done via a cloud-based service, a local area network, or a combination thereof. For instance, updating can occur in the cloud (e.g., with encryption in place), locally (e.g., among computing devices and/or apparatuses within a local area network), or both. In some instances, the data may also be sent to a cloud-based service for further retraining of machine learning models.

In some examples, the processing resource 340, the memory resource 338, or both can receive the machine learning model from a cloud-based service, augment the machine learning model with data collected while performing the cleaning task, and update the machine learning model while the apparatus 300 is coupled to a charging station with collected data. For instance, the apparatus 300 that is performing the cleaning task may receive data via sensors while cleaning but perform little to no processing while performing the cleaning task. When the apparatus 300 is charged, the received data is combined with other data associated with the machine learning model, and the machine learning model can be updated. This can allow for privacy protection, for instance, because the machine learning model is retrieved from the cloud-based service but retrained locally while the robot is charging, for instance using methods such as knowledge distillation and active learning, among others. This can prevent personal information from being sent to the cloud-based service.

In some examples, the apparatus 300 can include instructions executable to determine a cleaning path to follow during the cleaning task performance based on the received data and using the machine learning model. For instance, the machine learning model may determine particular portions of the surface historically go unused and may not require regular cleaning, or may only require a light vacuum, whereas other portions may be heavily used and need repeated cleaning over a same cleaning path, regular cleaning and regular aggressive scrubbing, extra cleaning material, vacuum suction, or other cleaning parameter adjustments.

In some instances, the apparatus 300 can include instructions executable to receive, at the processing resource or the memory resource, an image of the surface from a different processing resource of a computing device, receive a cleaning path to follow during the cleaning task performance, and update the received cleaning path based on the received data and using the machine learning model. For example, a user may upload an image via an application of the surface that can be used to determine the cleaning path. For instance, measurements can be determined from the image to reduce falls or damage to the apparatus 300 if the surface is not at ground level.

FIG. 4 is another functional diagram representing a processing resource 440 in communication with a memory resource 438 having instructions 450, 452, 454, 456, 458, 460, 462, 464, 466 written thereon in accordance with a number of embodiments of the present disclosure. The apparatus 400 can be analogous to the apparatus 100 and/or the apparatus 300 as illustrated in FIGS. 1 and 3, respectively.

The instructions 450, when executed by a processing resource such as the processing resource 440 can determine, via a temperature sensor of the apparatus, a temperature of a surface on which the apparatus 400 is located. For instance, the temperature sensor can determine a temperature of one or more portions of the surface to be cleaned or being cleaned by the apparatus 400.

The instructions 452, when executed by a processing resource such as the processing resource 440 can shut down the apparatus 400 in response to the temperature being at or above a particular threshold. The apparatus 400 may transmit an audible alert (e.g., beep), a visual alert (e.g., blinking light), wireless alert (e.g., alert smartphone via an application), or any combination thereof of the high temperature and shutdown. In some examples, the apparatus 400 may be restarted after a particular time period following the temperature being at or above the particular threshold temperature. A new temperature of the surface can be determined using the temperature sensor, and the apparatus 400 can be shut down again if the new temperature is at or above the particular threshold temperature. In some examples, if the apparatus 400 is shut down again, an additional alert may be transmitted. For instance, a user may receive an alert that reads, "Warning! Stovetop burner on!" via an application of a smartphone.

If the new temperature is below the particular threshold temperature, the apparatus 400 can perform the cleaning task, and the instructions 454, when executed by a processing resource such as the processing resource 440 can instruct the apparatus 400 to perform a cleaning task on the surface. The cleaning task can include, for instance, vacuuming, scrubbing, dispensing cleaning material, wipig a scrubbed surface, and other actions associated with cleaning the surface.

For instance, the instructions 456, when executed by a processing resource such as the processing resource 440 can instruct the apparatus 400 to perform a vacuum cleaning function on the surface as part of the cleaning task, the instructions 458, when executed by a processing resource such as the processing resource 440 can instruct the apparatus 400 to dispense a cleaning material on the surface as part of the cleaning task, the instructions 460, when executed by a processing resource such as the processing resource 440 can instruct the apparatus 400 to perform a scrubbing function on the surface as part of the cleaning task, and the instructions 461, when executed by a processing resource such as the processing resource 440 can instruct the apparatus 400 to perform a wiping function on the surface as part of the cleaning task. For instance, the apparatus 400 may follow a particular cleaning path to vacuum the surface, and subsequently follow the same particular cleaning path to dispense cleaning material, scrub the surface using the cleaning material and scrubbers on the apparatus 400, and wipe the scrubbed surface. In some examples, the scrubbing and wiping functions can be performed iteratively until a desired cleanliness is reached.

The instructions 462, when executed by a processing resource such as the processing resource 440 can detect, via a particle sensor of the apparatus, a particle in a path of the apparatus 400 while the apparatus 400 is performing the cleaning task, and the instructions 464, when executed by a processing resource such as the processing resource 440 can detect, via a friction sensor of the apparatus 400, a surface friction change of the surface while the apparatus 400 is performing the cleaning task. For instance, as the apparatus 400 performs the cleaning task, sensors gather data associated with the surface. A surface friction change, for example, can indicate stuck-on material or other items in the path of the apparatus 400 (e.g., a change from smooth to rough surface).

The instructions 466, when executed by a processing resource such as the processing resource 440 can adjust, during the cleaning task performance, a cleaning parameter associated with the vacuum cleaning function, the dispensing of the cleaning material, the scrubbing function, the wiping function, or any combination thereof based on the detected particles and the detected surface friction change. For example, if excess dirt is detected by a camera, the particle sensor, or the friction sensor, the vacuum suction function may be increased or repeated. Similarly, if the stuck-on material, grease, or a chemical is detected, scrubbing functions or dispensing functions (e.g., amount, type of cleaning material, etc.) may be adjusted.

In some instances, a status update of the performance of the cleaning task can be transmitted to a computing device accessible by a user. For instance, as noted above, temperature and shutdown updates may be transmitted. Cleaning task completion status updates may be transmitted, as well as low battery, low cleaning material level, low wipe supply, full waste bin, completion of each portion of the cleaning task status updates (e.g., done vacuuming, done scrubbing, etc.) or other status updates may be transmitted, for instance via an application. A report may be provided as a status update, for instance indicating different cleanliness levels, their locations on the surface, and/or their resolutions (e.g., used extra cleaning material).

In some examples, the apparatus 400 can include instructions executable to detect, via a material sensor of the apparatus 400, a particular material type in a path of the apparatus while the apparatus 400 is performing the cleaning task. For instance, the apparatus 400 may be used inside an oven (e.g., a commercial manufacturing oven). Such ovens may reach high temperatures and can include chemicals that may be harmful when contacted. Cleaning surfaces of the ovens can be dangerous and may result in injuries or damage to the oven. The apparatus 400 can use a temperature sensor to determine whether a cleaning task can proceed and can clean the surface while reducing personal injury risk or oven damage risk.

For instance, once the apparatus 400 has determined a cleaning task can commence (e.g., low enough temperature), the apparatus 400 can use the material sensor to detect particular chemicals (e.g., glycol) on the surface. Particular chemicals may indicate a leak in the oven, and the apparatus 400 can provide a notification via an audible alert, visual alert, or alert to a computing device accessible by a user (e.g., an application on a tablet) that the oven has a leak. This can initiate an oven shutdown until the leak is cleaned by the apparatus 400 and/or until the oven can be repaired. When no adverse materials are detected, the apparatus 400 can proceed with the cleaning task including, vacuuming, deploying cleaning material, scrubbing, and wiping, for instance.

Figure 5:
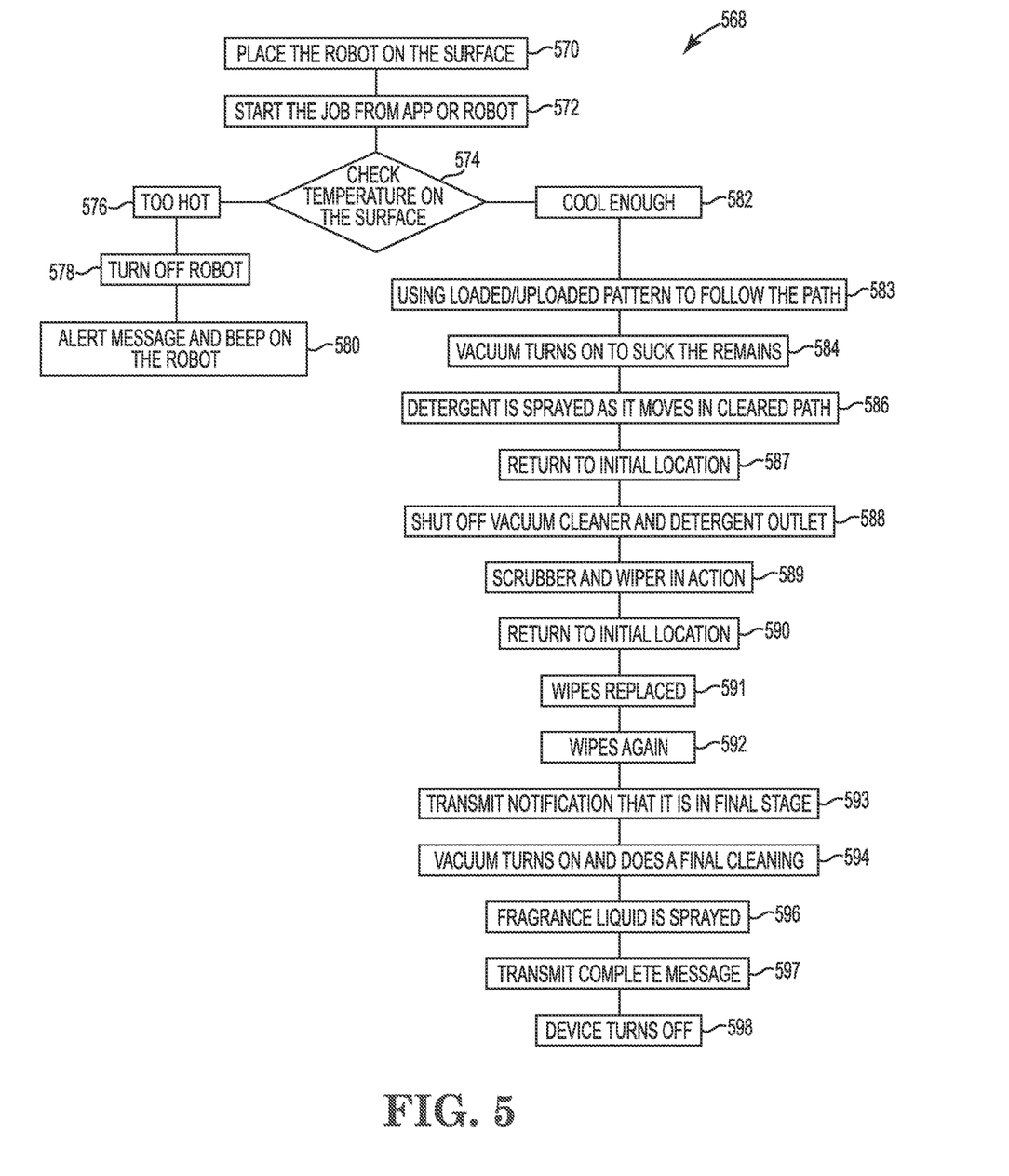
FIG. 5 is another flow diagram representing an example method for surface cleaning in accordance with a number of embodiments of the present disclosure.

FIG. 5 is another flow diagram representing an example method 568 for surface cleaning in accordance with a number of embodiments of the present disclosure. The method 568 can be performed by a system or apparatus, such as the apparatus 100, 300, or 400 described with respect to FIGS. 1, 3, and 4, respectively. In the example illustrated in FIG. 5, the cleaning apparatus described as a robot, but examples are not so limited.

At 570, the robot is placed on the surface to be cleaned. The robot can be a wireless apparatus and can be battery operated. The cleaning task can be started at 572. The cleaning task can be initiated at an application downloaded on a computing device in communication with the robot or on the robot itself (e.g., on/off button). At 574, a temperature sensor may be used to check the temperature of the surface to be cleaned. In some examples, a camera may be used to check the temperature. For instance, if the surface is a stovetop, the camera may detect a red burner surface or heat indicator light, indicating a portion of the surface is hot.

At 576, if it is determined the surface is too hot (e.g., at or above a particular threshold temperature), the robot can be turned off at 578. In such an example, an alert can be transmitted, at 580, to a computing device accessible by a user, and the robot can provide an audible (e.g., beep) and/or visual alert (e.g., blinking light) of the shutdown.

At 582, if it is determined the surface is cool enough (e.g., below the particular threshold temperature), the cleaning task can commence. At 583, the cleaning path can include a pattern loaded or uploaded via an application of a computing device in communication with the robot. For instance, based on an image of the surface, a user may choose a path for the robot, which may be updated as more cleaning tasks are performed. The beginning of the path can be referred to as the "initial location" of the robot, and the robot may repeatedly return to the initial location during the cleaning task.

At 584, the vacuum component of the robot can be turned on and a vacuum function can be performed following the cleaning path. As the robot vacuums, a cleaning material (e.g., detergent) can be sprayed onto the vacuumed surface at 586. Using sensors on the robot, including a friction sensor, a particle sensor, a camera, or any combination thereof, the amount of suction used and cleaning material dispensed on the surface may change. For instance, if large amounts of dirt are detected, increased suction may be used. In some examples, the robot may repeat a vacuum function before spraying cleaning material to collect excess dirt, crumbs, dust or other particles. In an example where friction changes are detected (e.g., stuck-on food), more cleaning material may be dispensed at a higher pressure to address the change in pressure.

In some examples, different cleaning materials may be dispensed based on detected items. For instance, water may be dispensed in some examples, and a grease remover may be dispensed in others. An all-purpose cleaner may be dispensed in other examples. For instance, something needing soaking before scrubbing may receive a spray of water, while grease may receive a spray of grease remover. Other portions of the surface may receive all-purposed cleaner. In some examples, a cleaning material spray task may be repeated if more cleaning material is needed or scrubbing does leave desired results after one pass.

The robot, at 587, can return to its initial location, and at 588, the vacuum function may be shut off, and the cleaning material outlet may be closed. At 589, a scrubbing function may commence. The scrubbers may work with the cleaning material to clear unwanted material from the surface. Based on items detected by the aforementioned sensors, the pressure, speed, or both, of the scrubbers may be adjusted during the cleaning task. The scrubbing function may be repeated (after a repeat cleaning material spray) if desired results are not met, for example if sensors continue to detect items in the path of the robot. As the robot performs the scrubbing function, a wiping function can occur that includes wiping the surface using wipes from a wipe dispenser to remove scrubbing residue (e.g., cleaning material residue).

At 590, the robot can return to its initial location, and at 591, the wipe can be replaced. This replacement can occur automatically. The previous wipe may be discarded in a waste receptacle inside the robot. Other items collected by the robot (e.g., vacuumed) may be collected in the same or a different waste receptacle of the robot. In some examples, the method 568 can be performed iteratively among some or all of the portions of the cleaning task. For instance, the method 568 may loop from task 586 through task 590 or 591 (e.g., if the wipe needs replacement) until the surface reaches a desired cleanliness. The method 586 can then continue to a final wipe, for instance at 592, and onto the rest of the method 586.

At 592, the robot can perform a second wipe of the surface with the replacement wipe and returns to the initial location. At 593 the robot can transmit a notification that the robot is in the final stage of cleaning. This notification can be an audible or visual notification on the robot itself, a notification via an application, or both. A vacuum function can begin at 594 to perform a final cleaning of the surface, and during performance of the vacuum function, a fragrance spray may be dispensed. In some examples, the fragrance spray can be performed separately.

At 597, a message indicating completion of the cleaning task can be transmitted and can include an audible or visual notification on the robot itself, a notification via an application, or both. At 598, the robot shuts down. Data gathered during the cleaning task can be used to update a machine learning model to improve a cleaning path, estimate future lengths of cleaning times, improve efficiency of the cleaning task and robot, improve effectiveness of the robot, or any combination thereof.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a processing resource;
a temperature sensor, a particle sensor, and a friction sensor in communication with the processor; and
a memory resource in communication with the processing resource having instructions executable to:
instruct the apparatus to perform a first cleaning task on a surface on which the apparatus is located;
receive and analyze, at the processing resource, from the temperature sensor, the particle sensor, and the friction sensor, data about the surface on which the apparatus is located and performing the first cleaning task, wherein:
the data received from the temperature sensor comprises a temperature of each of a plurality of portions of the surface;
the data received from the particle sensor comprises detected particles on each of a plurality of portions of the surface; and
the data received from the friction sensor comprises an amount of friction on each of a plurality of portions of the surface;
determine, utilizing a machine learning model, a status of the surface and the first cleaning task based on the received and analyzed data about the surface;
instruct the apparatus to adjust an apparatus cleaning parameter of the first cleaning task during the cleaning task performance by the apparatus and based on the received and analyzed data about the surface and the machine learning model;

instruct the apparatus to change to a second cleaning task based on the received and analyzed data about the surface and the machine learning model;

update the machine learning model based on the received and analyzed data about the surface and data previously received and analyzed from the temperature sensor, the particle sensor, and the friction sensor during previous cleaning task performances; and instruct the apparatus to perform a second cleaning task on the surface based on the updated machine learning model.

2. The apparatus of claim 1, further comprising the instructions executable to determine a cleaning path to follow during the cleaning task performance based on the received and analyzed data and using the machine learning model.

3. The apparatus of claim 1, wherein the instructions executable to adjust the apparatus cleaning parameter comprise instructions executable to adjust an amount of cleaning material dispensed from a dispenser of the apparatus.

4. The apparatus of claim 1, wherein the instructions executable to adjust the apparatus cleaning parameter comprise instructions executable to adjust a speed of a scrubber of the apparatus, a pressure of the scrubber of the apparatus, or both.

5. The apparatus of claim 1, further comprising instructions executable to:

receive, at the processing resource or the memory resource, an image of the surface from a different processing resource of a computing device;

receive a cleaning path to follow during the cleaning task performance; and update the received cleaning path based on the received and analyzed data and using the machine learning model.

6. The apparatus of claim 1, further comprising instructions executable to:

receive the machine learning model from a cloud-based service;

augment the machine learning model with the data received during the cleaning task performance; and update the machine learning model while the apparatus is coupled to a charging station with the received data.

7. The apparatus of claim 1, further comprising instructions executable to learn about the surface and the cleaning task and update the machine learning model via a cloud-based service, a local area network, or a combination thereof.

8. An apparatus, comprising:

a processing resource; and a memory resource in communication with the processing resource having instructions executable to:

determine, via a temperature sensor of the apparatus, a temperature of a surface on which the apparatus is located;

in response to the temperature being at or above a particular threshold temperature, shut down the apparatus; and in response to the temperature being below the particular threshold temperature:

instruct the apparatus to perform a cleaning task on the surface, wherein the cleaning task comprises the processing resource having instructions executable to:

instruct the apparatus to perform a vacuum cleaning function on the surface;

instruct the apparatus to dispense a cleaning material on the surface; and instruct the apparatus to perform a scrubbing function on the surface;

instruct the apparatus to perform a wiping function on the surface;

detect, via a particle sensor of the apparatus, a particle in a path of the apparatus while the apparatus is performing the cleaning task;

detect, via a friction sensor of the apparatus, a surface friction change of the surface while the apparatus is performing the cleaning task; and adjust, during the cleaning task performance, a cleaning parameter associated with the vacuum cleaning function, the dispensing of the cleaning material, the scrubbing function, the wiping function, or any combination thereof based on the detected particle and the detected surface friction change.

9. The apparatus of claim 8, further comprising instructions executable to detect, via a material sensor of the apparatus, a particular material type in a path of the apparatus while the apparatus is performing the cleaning task.

10. The apparatus of claim 8, further comprising instructions executable to transmit a status update of the performance of the cleaning task to a computing device accessible by a user.

11. The apparatus of claim 8, further comprising instructions executable to instruct the apparatus to:

in response to the temperature being at or above the particular threshold temperature, restart the apparatus after a particular time period and determine a new temperature of the surface using the temperature sensor;

shut down the apparatus in response to the new temperature being at or above the particular threshold temperature; and instruct the apparatus to perform the cleaning task on the surface in response to the new temperature being below the particular threshold temperature.

\* \* \* \* \*